United States Patent
Kaufman et al.

(10) Patent No.: US 10,158,400 B2
(45) Date of Patent: Dec. 18, 2018

(54) FREQUENCY SELECTIVE POWER MONITOR

(71) Applicant: Ametek Power Instruments, Wilmington, MA (US)

(72) Inventors: Barry M. Kaufman, Pine Brook, NJ (US); Anthony G. Bell, Coral Springs, FL (US)

(73) Assignee: THE AMETEK POWER INSTRUMENTS, Wilmington, MA (US)

( * ) Notice: Subject to any disclaimer, the term of this patent is extended or adjusted under 35 U.S.C. 154(b) by 225 days.

(21) Appl. No.: 14/967,616

(22) Filed: Dec. 14, 2015

(65) Prior Publication Data

US 2016/0169950 A1    Jun. 16, 2016

Related U.S. Application Data

(60) Provisional application No. 62/091,262, filed on Dec. 12, 2014.

(51) Int. Cl.
| | | |
|---|---|---|
| *G01R 31/40* | (2014.01) | |
| *H04B 3/54* | (2006.01) | |
| *H04B 3/46* | (2015.01) | |

(52) U.S. Cl.
CPC ............... *H04B 3/54* (2013.01); *H04B 3/46* (2013.01); *H04B 2203/5483* (2013.01); *H04B 2203/5491* (2013.01)

(58) Field of Classification Search
CPC ... G01R 1/203; G01R 15/146; G01R 19/0007
See application file for complete search history.

(56) References Cited

U.S. PATENT DOCUMENTS

| | | | | |
|---|---|---|---|---|
| 6,067,475 A | * | 5/2000 | Graves | A61B 18/18 607/101 |
| 2003/0114182 A1 | * | 6/2003 | Chan | H03F 1/0261 455/525 |
| 2009/0134918 A1 | * | 5/2009 | Tzeng | G01R 31/31709 327/106 |

* cited by examiner

*Primary Examiner* — Tung X Nguyen
(74) *Attorney, Agent, or Firm* — McCormick, Paulding & Huber LLP

(57) ABSTRACT

A power line carrier fault detection system includes a forward signal generator configured to transmit a carrier signal to a power line. A directional coupler couples the forward signal generator to the power line. The directional coupler is configured to separate forward and reflected power. A frequency selective filter associated with the directional coupler is configured to meter frequencies within a band of a transmitted carrier signal and to attenuate out of band signals.

20 Claims, 1 Drawing Sheet

FREQUENCY SELECTIVE POWER MONITOR

CROSS-REFERENCE TO RELATED APPLICATION

This application claims the priority to U.S. Provisional Patent Application No. 62/091,262, filed Dec. 12, 2014, the contents of which is hereby incorporated herein by reference in its entirety.

TECHNICAL FIELD

This invention relates to power transmission and, more particularly, to monitoring radio frequency power transmission through high voltage power lines.

BACKGROUND

Conventional Narrow Band, On/Off or frequency shift keying Power Line Carrier equipment is used to assist sub-station and generating station fault protection relays with isolating a power line fault (overload current) to a segment of the power grid where the fault takes place. Circuit breakers on both sides of the fault are tripped to prevent the overload from taking down more of the grid.

This type of Power Line Carrier is commonly referred to as PLC. It is an RF transmitter and receiver that operate over AC transmission lines with voltage in the tens to hundreds of KV, and line distance of a few miles to over a hundred miles between RF transmitter and receiver. RF frequency range is 30 KHz to 530 KHz and output power is typically 1, 10 or 100 watts.

The term "Narrow Band" typically means receiver bandwidth of 300 Hz or 600 Hz or 1200 Hz. On/Off keying means simply turning the RF carrier on or off at command of the associated protective relay. For frequency shift keying ("FSK"), the transmitter is on all the time but shifts in frequency as commanded by the associated relay. There are usually two or three frequencies to select from, with the frequencies being mutually exclusive. All frequencies for a particular FSK communications link are within the receiver's bandwidth.

The transmitter section typically has a self contained RF output power monitor to continuously measure forward power and reflected power. There will be no reflected power if the transmission line load impedance exactly matches the transmitter output impedance. Full output power cannot be delivered to the load if there is a mismatch. A large mismatch indicated by high percent reflected power implies that RF coupling equipment between transmitter and AC power line has a serious defect that needs repair.

A problem with the conventional type of forward/reflected power monitor is that it has very wide bandwidth and may be affected by RF signals way out of the narrow band of interest that the transmitter occupies. Said interfering signals are applied from the RF transmission line back to the transmitter and may be caused by, among other things, other PLC transmitters that share the power line, and even high power broadcast stations being picked up by the long power line acting as an antenna. The primary effect of this interference is to cause a reflected power measurement error.

One known solution to this problem for providing power monitoring for a power line carrier is to use a dedicated second receiver with a filter for the power meter. However, this second receiver and filter solution is far from cost effective. Another, alternative, solution is to re-program the main, single receiver to the transmit channel frequency to indicate reflected power. However, when this is done, the receiver can no longer do its primary task of protective relaying and, therefore, the reprogramming of a single receiver for power measurement can only be done when the power line carrier equipment is taken out of service.

SUMMARY

The power monitoring provided by the present invention improves Narrow Band, On/Off or frequency shift keying Power Line Carrier equipment by assisting sub-station and generating station fault protection relays with isolating a power line fault (overload current) to only that segment of the power grid where the fault takes place in a cost effective manner that does not require the power line carrier equipment to be taken out of service.

The present invention advantageously provides a power line carrier or external booster amplifier built-in transmit radio frequency ("RF") power meter that is cost effective and that measures reflected power of only the transmit frequency and may do so continuously without taking any equipment out of service.

According to embodiments, a power line carrier fault detection system comprises a forward signal generator configured to transmit a signal to the power line and a directional coupler coupling the forward signal generator to the power line. The directional coupler is configured to separate forward and reflected power. A frequency selective filter associated with the directional coupler is configured to meter frequencies within a band of a transmitted carrier signal and to attenuate out of band signals.

According to embodiments, the forward signal generator includes a direct digital synthesizer.

According to embodiments, at least one of a low pass filter or a power amplifier is operatively connected between the forward signal generator and the power line.

According to embodiments, outputs of the directional coupler are used to measure forward and reflected energy for at least one of logging, diagnostics, automatic power level control or error reporting.

According to embodiments, a first output of the directional coupler is configured to provide forward energy at the transmit frequency and is operatively connected to a first rectifier.

According to embodiments, the first rectifier converts voltage provided by the first output to DC.

According to embodiments, the system further comprising a micro-controller configured to control a transmit frequency of the forward signal generator and the first rectifier may be operatively connected to the micro-controller to provide the micro-controller with an indication of the forward power.

According to embodiments, the frequency selective filter may comprise an analog multiplier including a first input connected to a second output of the directional coupler and configured to receive reflected power therefrom and a second input connected to a tracking generator, the tracking generator configured to produce a continuous sinewave at a frequency that is offset from the forward signal generator. A product output of the analog multiplier may be sum and difference frequencies of the transmit frequency generated by the forward signal generator and the tracking offset frequency generated by the tracking generator.

According to embodiments, the system may further comprise a low pass filter between the tracking generator and the second input of the analog multiplier for filtering the continuous sinewave generated by the tracking generator.

According to embodiments, the frequency selective filter may further comprise, connected to the output of the analog multiplier, at least one of a low pass filter comprising a cutoff above the offset frequency or a band pass filter with center frequency equal to the offset frequency.

According to embodiments, the tracking generator may be configured to produce a signal offset from the forward signal generator by approximately 50 Hz.

According to embodiments, the cutoff frequency of the low pass filter may be approximately 80 Hz to provide the low pass filter with an output sinewave amplitude that is proportional to the amplitude of reflected power at the second output of the directional coupler and that is free of out-of-band interference and noise.

According to embodiments, an output of the at least one low pass filter or band pass filter may be operatively connected to a second rectifier configured to covert AC output to DC.

According to embodiments, the second rectifier may be operatively connected to a micro-controller to provide the micro-controller with an indication of the reflected power.

According to embodiments, a power monitor may comprise a forward signal generator configured to transmit a signal to a power line, a micro-controller configured to control a transmit frequency of the forward signal generator, a tracking generator configured to produce a continuous offset signal having a constant frequency offset from the signal transmitted by the forward signal generator, and a directional coupler coupling the forward signal generator to the power line. The directional coupler may be configured to separate forward power transmitted to the power line and reflected power received from the power line. The power monitor may further comprise a frequency selective filter connected to the directional coupler. A first rectifier may be provided having an input coupled to a first output of the directional coupler and an output connected to the micro-controller. The first rectifier may be configured to convert voltage provided by the first output to DC. The frequency selective filter may comprise an analog multiplier including a first input connected to a second output of the directional coupler and configured to receive reflected power therefrom and a second input connected to the tracking generator, at least one of a low pass filter or a band pass filter connected to the output of the analog multiplier, and a second rectifier having an input connected to an output of the at least one low pass filter or band pass filter and an output connected to the micro-controller. The second rectifier may be configured to covert output voltage therefrom to DC and the frequency selective filter may be configured to meter frequencies within a band of a transmitted carrier signal and to attenuate all other out of band signals.

According to embodiments, the micro-controller may be configured to measure forward and reflected energy for at least one of logging, diagnostics, automatic power level control or error reporting.

According to embodiments, a method for detecting faults in a power line carrier may comprise transmitting, by a forward signal generator, a carrier signal to a power line, separating, by a directional coupler coupling the forward signal generator to the power line, forward power and reflected power, and metering, by a frequency selective filter connected to the directional coupler, frequencies of the forward power and reflected power within a band of the transmitted carrier signal to attenuate out of band signals.

According to embodiments, the method may further comprise providing, by a tracking generator to the frequency selective filter, a continuous offset signal having a constant frequency offset from the transmitted carrier signal.

According to embodiments, the method may further comprise controlling, by a micro-controller, a transmit frequency of the carrier signal transmitted by the forward signal generator.

According to embodiments, the method may further comprise measuring, by the micro-controller, forward and reflected energy for at least one of logging, diagnostics, automatic power level control or error reporting.

These and other objects, features and advantages of the present disclosure will become apparent in light of the detailed description of embodiments thereof, as illustrated in the accompanying drawing.

DETAILED DESCRIPTION

Figure 1:
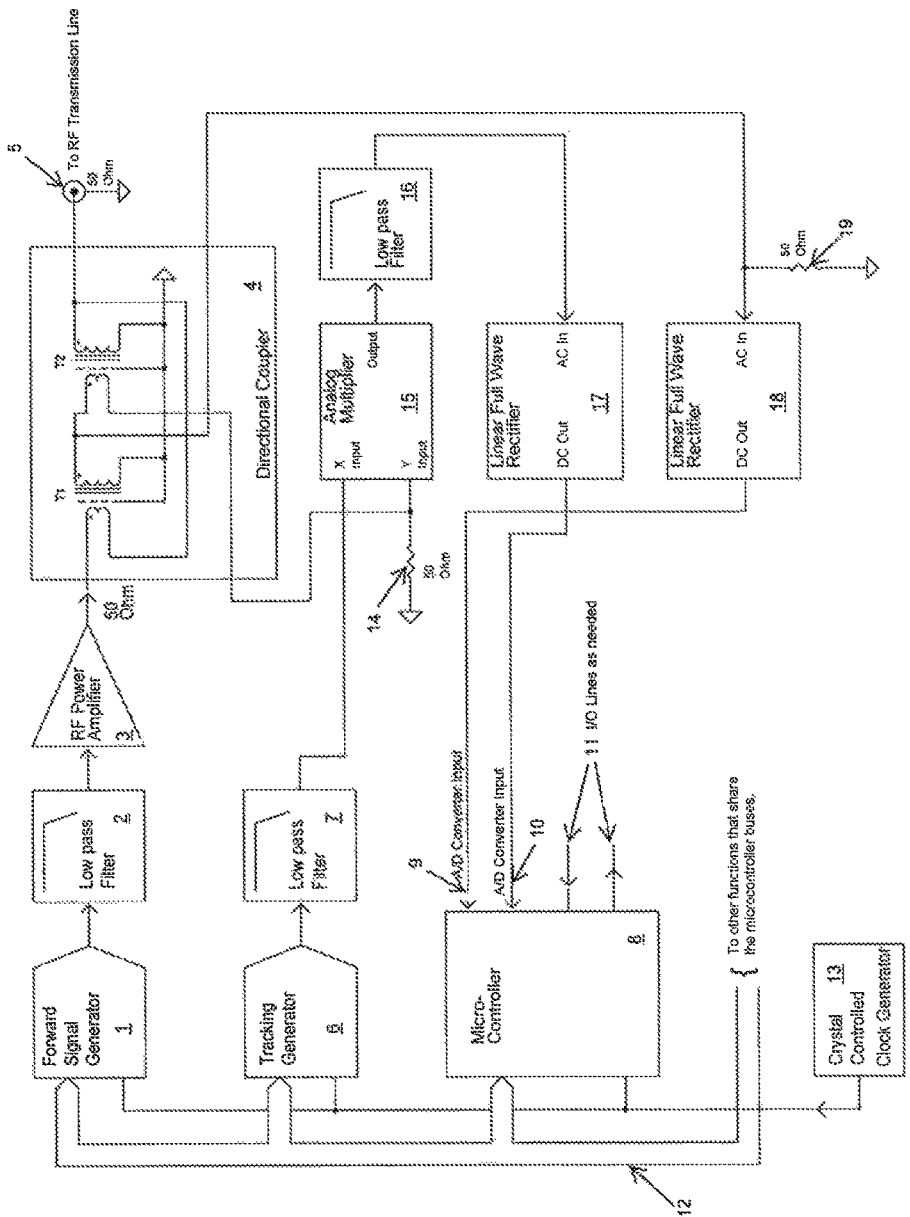
FIG. 1 is a schematic diagram of an exemplary power transmission monitor.

Referring to the FIG. 1, a forward signal generator (1) transmits a signal to the RF transmission line (5) (e.g. a section of the power grid) that is received by a receiver at another end of the RF transmission line (5) for monitoring the section to determine if a problem occurs in that section of the grid. The forward signal generator (1) may be, for example, a direct digital synthesizer or the like and may operate in conjunction with a low pass filter (2) and/or a power amplifier (3) to provide the desired signal to the RF transmission line (5). The low pass filter (2) may be, for example, a 1.0 MHz filter of the like.

For instance, in embodiments, the forward signal generator (1) may be a direct digital synthesizer that may output an analog sine wave from an internal digital/analog converter and may be programmed to the desired transmit frequency by a micro-controller (8) of the Power Line Carrier. The micro-controller (8) can rapidly shift the direct digital synthesizer frequency and can turn the direct digital synthesizer output ON or OFF, thus satisfying all the above-mentioned PLC keying states.

In embodiments, the forward signal generator (1) output may be stair stepped at multi megahertz clock rate and digital remnants above 530 KHz upper limit of the Power Line Carrier band may be removed by a 1 MHz low pass filter (2), the output of which may drive input of a linear RF power amplifier (3). Impedance of the transmitter and transmission line may be 50 ohms, which is common in the industry.

The power line carrier or external booster amplifier built-in transmit RF forward and reflected power meter according to the present invention includes a directional coupler (4), which may be a conventional Stockton type directional coupler or any other type of directional coupler known in the art. Stockton type directional couplers have, for example, been used for decades with commercial and ham radio transmitters for separating forward and reflected power.

The directional coupler (4) is housed within the power line carrier terminal or within the external power booster amplifier that is used to boost the output of a power line carrier transmitter and couples the output from the forward signal generator (1) to the RF transmission line (5). The outputs of the directional coupler (4) are used by the built-in power meter to measure forward and reflected energy within the power line carrier terminal or the booster amplifier for logging, diagnostics, automatic power level control, error reporting or other internally needed functions as should be understood by those skilled in the art.

For instance, the directional coupler (4) shown in FIG. 1 taps a small percentage of RF power flowing from the amplifier (3) to the RF transmission line (5), to give a voltage at resistor (19) representing forward power. It also taps a small percentage of RF power flowing from the RF transmission line (5) to the amplifier (3) to give a voltage at resistor (14) representing reflected power. Thus, the RF directional coupler (4) puts out a voltage representing forward power (in a direction from the transmitter to the power line (5)) from a first output and another voltage representing reflected power (in a direction from the power line (5) back to the transmitter) from a second output.

Directional couplers typically have no frequency selectivity so any out of channel signals applied to the power line by directly connected transmitters, by radio signals picked up by the power line or the like, will produce directional coupler output interference that will degrade accuracy of the transmitter's forward and reflected power measurement. Thus, as discussed in greater detail below, the built-in power meter of the present invention also includes a frequency selective filter associated with the directional coupler (4) such that only frequencies within the band of a transmitted carrier signal are metered, all other "out of band" signals being attenuated. This frequency selective filtering and detecting is far less complex and less costly than a conventional power line carrier receiver (e.g. a second, dedicated receiver) designed to receive a signal from a distant transmitter. Additionally, the monitoring of forward and reflected power with frequency selectivity according to the present invention does not require taking out of service the receiver that is already part of the power line carrier terminal used to receive a distant transmitter.

To measure forward power, the first output of the directional coupler (4), which is the voltage across resistor (19) and is at the transmit frequency, is passed to a first linear full wave rectifier (18). The first full wave rectifier (18) converts this voltage to DC. A conventional operational rectifier may be used for this purpose, and may have a dual inexpensive operational amplifier IC to give linear conversion over a wide dynamic range. In embodiments, the first full wave rectifier (18) may include an output ripple filter, such as a capacitor added across the output op-amp feedback resistor to remove the carrier frequency ripple. The DC output of this first linear full wave rectifier (18) is then provided to a first analog/digital converter input (9) of a micro-controller (8) of the power line carrier or external booster amplifier. The micro-controller (8), therefore, knows the forward power and may pass the reading to a front panel display or to a communications network, or it may log and alarm abnormal readings.

It is typically not necessary to provide frequency selectivity for forward power metering because transmitter output impedance is a close match to the directional coupler impedance (commonly 50 ohm), and therefore rejection of signals from the power line is high. However, forward power frequency selectivity can be applied, if necessary, by duplicating what is described below for the reflected power measurement function.

However, since the directional coupler (4) has bandwidth beyond that of the entire power line carrier band, other RF signals applied to the high voltage power line may cause reflected power measurement error, as discussed above. Therefore, the built-in power meter of the present invention provides frequency selectivity to reflected power measurement, with the selected frequency adapting to the transmitter frequency.

To measure reflected power with frequency selectivity, the second output of the directional coupler (4), which is the voltage at resistor (14), is passed to an analog multiplier (15) where it is applied to one input (e.g. the y input) of the analog multiplier (15). Output of a tracking generator (6) producing a continuous, single sinewave is applied to the other input (e.g. the x input) of the analog multiplier (15). The tracking generator (6) may be, for example, a direct digital synthesizer or the like and may operate in conjunction with a low pass filter (7), which may be, for example, a 1.0 MHz filter or the like, to provide the desired signal to the input of the analog multiplier (15). The tracking generator (6) and the 1.0 MHz low pass filter (7) may, for example, operate in essentially the same manner as the forward signal generator (1) and the low pass filter (2) described above, except that the tracking generator (6) is set to a an offset frequency such as a frequency of either 50 Hz lower or 50 Hz higher than the transmit frequency of the forward signal generator (1). That tracking generator (6), thus, tracks the transmitter frequency of the forward signal generator (1) but is always offset in frequency from the transmit frequency. The offset is typically less than ½ channel bandwidth, for example, in embodiments the offset may be 50 Hz as described above.

As discussed above, the output of low pass filter (7), thus, drives the x input of the analog multiplier IC (15) and the voltage across resistor (14), representing reflected power, drives the y input of the analog multiplier IC (15). The product output of the analog multiplier IC (15) is sum and difference frequencies of the transmit frequency generated by the forward signal generator (1) and the tracking offset frequency generated by the tracking generator (6).

Output of the analog multiplier (15) drives input of a low pass filter (16) with a cutoff above the offset frequency, or drives input of a band pass filter with center frequency equal to the offset frequency. For instance, in the exemplary embodiment discussed above with an offset of 50 Hz, the low pass filter (16) may be set with a cutoff frequency of approximately 80 Hz. The low pass filter (16) removes the sum frequency and attenuates all frequencies greater than 80 Hz away from the tracking frequency of the tracking generator (6). Skirt selectivity of the low pass filter (16) depends on the filter's order and, in embodiments, the low pass filter (16) may attenuate the adjacent channel and beyond by say 40 dB. The narrowest channel spacing for PLC is typically 500 Hz. Small size and economical low pass filtering is achievable either with an active or switched capacitor LPF.

The output sinewave amplitude of the low pass filter (16) (or band pass filter) is, thus, proportional to the amplitude of RF voltage at directional coupler reflected power port, but is advantageously free of out-of-band interference and noise. The simplicity for providing this frequency selectivity is an advantageous feature of the present invention.

An example for power line carrier frequency shift and selectivity according to the present invention may be from a +−250 Hz signal from the forward signal generator (1) with −250 Hz being Trip frequency and +250 Hz being Guard frequency. In this exemplary embodiment, the tracking generator (6) may be set to a frequency of +200 Hz if the transmitter (1) is at +250 Hz or to a frequency of −200 Hz if the transmitter (1) is at −250 Hz. The adjacent channel is 1.0 KHz away so, for an adjacent channel above our channel, the nearest interfering frequency is −250 Hz from its center. Because tracking generator 6 is at our center frequency +200 Hz, the lowest frequency beat note that must be rejected by low pass filter 16 is 1 KHz −250 Hz−200 Hz=550 Hz. The above mentioned analog multiplier (15) along with tracking generator (6) act like a receiver mixer and oscillator stage and the above mentioned lowpass filter (16) (or bandpass filter) acts like a receiver IF stage to provide the necessary frequency shift and selectivity.

The interference/noise free output of the low pass filter (16) is then passed to a second linear full wave rectifier (17). The full wave rectifier (17) converts AC output of the low pass filter (16) to DC. In embodiments, a conventional operational rectifier may be used and may have a dual inexpensive operational amplifier IC to give linear conversion over a wide dynamic range. The second full wave rectifier (17) may also include an output ripple filter, such as a capacitor added across the output op-amp feedback resistor to remove ripple.

The DC output of the second linear full wave rectifier (17) is then provided to a second analog/digital converter input (10) of the micro-controller (8) of the power line carrier or external booster amplifier. The micro-controller (8), therefore, knows the reflected power and may pass the reading to a front panel display or to a communications network, or it may log and alarm abnormal readings.

Knowing both forward and reflected power, the micro-controller (8) may calculate and display popular metrics like: standing wave ratio, return loss, percent reflected power or the like.

The forward and reflected energy signals provided to the micro-controller (8) within the power line carrier terminal or the booster amplifier may, thus, be used for logging, diagnostics, automatic power level control, error reporting or other internally needed functions as should be understood by those skilled in the art. The forward and reflected energy signals or other processed signals relating to the forward and reflected energy signals may also be communicated externally from the power line carrier terminal, for example, through other input/output lines (11), such as wired or wireless communication channels such as a USB port, over WiFi or the like.

Additionally, as should be understood by those skilled in the art, the forward signal generator (1), the tracking generator (6), the micro-controller (8) and/or other components may be in communication with one another through a data and control bus (12) to achieve the various functions discussed above. A clock generator (13) may also be operatively connected to the forward signal generator (1), the tracking generator (6) and/or the micro-controller (8) to provide input used in the generation of the carrier signal and/or tracking signal.

Advantageously, the built-in transmit RF forward and reflected power meter according to the present invention may be housed and applied entirely within the power line carrier or the external booster amplifier. For instance, as discussed above, the various components of the power meter may be connected to the internal circuitry of the power line carrier terminal (or external booster amplifier) so that all measurements are determined entirely within the power line carrier terminal (or external booster amplifier).

The built-in transmit RF forward and reflected power meter according to the present invention may advantageously be implemented without taking the receiver of the power line carrier offline and is much cheaper and requires less space than adding a second receiver to the power line carrier. Additionally, the power meter according to the present invention generates less heat and requires less power than a dedicated second receiver.

The power meter of the present invention also overcomes the deficiencies of wide-band forward and reflected power meters for monitoring output power from a power line carrier, which may give an error reading because of RF signals on the power line that are not within the narrow frequency band of interest. Power meters without frequency selectivity will identify these out-of-band signals as reflected power, because that energy may be flowing in the same direction as the reflected power. The present invention solves this problem by making reflected power measurement frequency selective, thus rejecting frequencies that are other than the local transmitter's frequency, and does so in a very cost effective compared to dedicating a regular PLC receiver to the task.

The power monitor of the present invention, in particular, may advantageously provide continuous measurement of transmit reflected power under all conditions of normal power line carrier operation. By comparing the transmitted forward power and reflected power, the built in power monitor may determine if the actual power being output power is the desired power output. An alarm threshold may be set to trigger an alarm when the measurement indicates the reflected power is too high, thereby providing an early warning before equipment completely fails as well as locating at which end of the power line the problem exists. The alarm threshold may be preset to a specific fixed value depending upon the forward RF power output, such as 0.25 W or 2.5 W for 1 W or 10 W RF power output signals, respectively, or may be an adaptable threshold that is changed automatically by the built-in power meter as a function of the intended RF power output.

Although the tracking generator (6) has been described above as a direct digital synthesizer, it should be understood by those skilled in the art that there are many ways to make a tracking generator. For instance, the tracking generator (6) could be a phase locked loop or a numerically controlled oscillator (NCO). The NCO approach may advantageously allow for the tracking generator (6) to be directly and rapidly programmed to desired frequency by an embedded micro-controller, such as the micro-controller (6), which is already in the power line carrier terminal. Adding the NCO is also as simple as adding another peripheral device, with only a very few low cost parts necessary for the addition.

Power line carrier is a specialized field that requires specialized test equipment. Having test equipment built-in to the unit, as may be the case in the present invention, is advantageously cost effective since there is already processing power available in the power line carrier.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A power line carrier fault detection system comprising:
    a forward signal generator configured to transmit a signal to the power line;
    a directional coupler coupling the forward signal generator to the power line, the directional coupler configured to provide separate indications of forward and reflected power through first and second output ports, respectively; and a frequency selective filter connected to the second output port of the directional coupler and configured to meter frequencies within a band of the transmitted signal and to attenuate out of band signals.

2. The power line carrier fault detection system according to claim 1, wherein the forward signal generator includes a direct digital synthesizer.

3. The power line carrier fault detection system according to claim 1, wherein at least one of a low pass filter or a power amplifier is operatively connected between the forward signal generator and the power line.

4. The power line carrier fault detection system according to claim 1, wherein the first and second output ports of the directional coupler are used to measure forward and reflected energy for at least one of logging, diagnostics, automatic power level control or error reporting.

5. The power line carrier fault detection system according to claim 1, wherein the first output port of the directional coupler is configured to provide the indication of forward energy at the transmit frequency and is operatively connected to a first rectifier.

6. The power line carrier fault detection system according to claim 5, wherein the first rectifier converts voltage provided by the first output port to DC.

7. The power line carrier fault detection system according to claim 6, further comprising a micro-controller configured to control a transmit frequency of the forward signal generator;
wherein the first rectifier is operatively connected to the micro-controller to provide the micro-controller with an indication of the forward power.

8. The power line carrier fault detection system according to claim 1, wherein the frequency selective filter comprises an analog multiplier including a first input connected to the second output port of the directional coupler and configured to receive the indication of reflected power therefrom and a second input connected to a tracking generator, the tracking generator configured to produce a continuous sinewave at a frequency that is offset from the forward signal generator;
wherein a product output of the analog multiplier is sum and difference frequencies of the transmit frequency generated by the forward signal generator and the tracking offset frequency generated by the tracking generator.

9. The power line carrier fault detection system according to claim 8, further comprising a low pass filter between the tracking generator and the second input of the analog multiplier for filtering the continuous sinewave generated by the tracking generator.

10. The power line carrier fault detection system according to claim 8, wherein the frequency selective filter further comprises, connected to the output of the analog multiplier, at least one of a low pass filter comprising a cutoff above the offset frequency or a band pass filter with center frequency equal to the offset frequency.

11. The power line carrier fault detection system according to claim 10, wherein the tracking generator is configured to produce a signal offset from the forward signal generator by 50 Hz.

12. The power line carrier fault detection system according to claim 11, wherein the cutoff frequency of the low pass filter is approximately 80 Hz to provide the low pass filter with an output sinewave amplitude that is proportional to the amplitude of reflected power at the second output port of the directional coupler and that is free of out-of-band interference and noise.

13. The power line carrier fault detection system according to claim 10, wherein an output of the at least one low pass filter or band pass filter is operatively connected to a second rectifier configured to covert AC output to DC.

14. The power line carrier fault detection system according to claim 13, wherein the second rectifier is operatively connected to a micro-controller to provide the micro-controller with an indication of the reflected power.

15. The power line carrier fault detection system according to claim 1, wherein the directional coupler, tracking generator, and frequency selective filter are built into a same housing as a radio frequency transmitter configured to be used in a high voltage power transmission system.

16. The power line carrier fault detection system according to claim 1, wherein the tracking generator, directional coupler, and frequency selective filter are built into a same housing of a booster amplifier configured to be used in a high voltage power transmission system.

17. A power monitor comprising:
a forward signal generator configured to transmit a signal to a power line;
a micro-controller configured to control a transmit frequency of the forward signal generator;
a tracking generator configured to produce a continuous offset signal having a constant frequency offset from the signal transmitted by the forward signal generator;
a directional coupler coupling the forward signal generator to the power line, the directional coupler configured to separate forward power transmitted to the power line and reflected power received from the power line; and
a frequency selective filter connected to the directional coupler, the frequency selective filter comprising:
a first rectifier having an input coupled to a first output of the directional coupler and an output connected to the micro-controller, the first rectifier configured to convert voltage provided by the first output to DC;
an analog multiplier including a first input connected to a second output of the directional coupler and configured to receive reflected power therefrom and a second input connected to the tracking generator;
at least one of a low pass filter or a band pass filter connected to the output of the analog multiplier; and
a second rectifier having an input connected to an output of the at least one low pass filter or band pass filter and an output connected to the micro-controller, the second rectifier configured to covert output voltage therefrom to DC;
wherein the frequency selective filter is configured to meter frequencies within a band of a transmitted carrier signal and to attenuate all other out of band signals.

18. A method for detecting faults in a power line carrier, the method comprising:
transmitting, by a forward signal generator, a carrier signal to a power line;
providing, by a directional coupler coupling the forward signal generator to the power line, indications of forward power and reflected power through first and second output ports, respectively, of the directional coupler; and
metering, by a frequency selective filter connected to the second output port of the directional coupler, frequencies of the reflected power within a band of the transmitted carrier signal to attenuate out of band signals.

19. The method according to claim 18, further comprising:

providing, by a tracking generator to the frequency selective filter, a continuous offset signal having a constant frequency offset from the transmitted carrier signal; and controlling, by a micro-controller, a transmit frequency of the carrier signal transmitted by the forward signal generator.

20. The method according to claim 19, further comprising:

measuring, by the micro-controller, forward and reflected energy for at least one of logging, diagnostics, automatic power level control or error reporting.

* * * * *